United States Patent
Nakamichi

(10) Patent No.: US 6,587,406 B1
(45) Date of Patent: Jul. 1, 2003

(54) CHANGER TYPE COMPACT DISK REPRODUCTION DEVICE

(75) Inventor: Niro Nakamichi, Tokyo (JP)

(73) Assignee: Nakamichi Corporation, Tokyo (JP)

( * ) Notice: Subject to any disclaimer, the term of this patent is extended or adjusted under 35 U.S.C. 154(b) by 0 days.

(21) Appl. No.: 09/363,502

(22) Filed: Mar. 27, 2000

(Under 37 CFR 1.47)

(51) Int. Cl.[7] .......................... G11B 15/675; G11B 33/02
(52) U.S. Cl. ...................................... 369/30.85; 369/77.1
(58) Field of Search .......................... 369/77.1, 178.01, 369/30.85, 30.51; 360/126

(56) References Cited

U.S. PATENT DOCUMENTS

| | | | |
|---|---|---|---|
| 4,682,320 A | 7/1987 | d'Alayer de Costemore d' Arc | 369/77.1 |
| 4,701,900 A | 10/1987 | Hasegawa et al. | 369/36 |
| 4,979,160 A | 12/1990 | Araki | 369/75.2 |
| 5,113,388 A | 5/1992 | Yamada et al. | 369/270 |
| 5,123,001 A | 6/1992 | Nakamichi et al. | 369/36 |
| 5,274,620 A | 12/1993 | Sipos | 369/77.2 |
| 5,502,697 A | 3/1996 | Taki | 369/34 |
| 5,544,148 A | 8/1996 | Nakamichi | 369/192 |
| 5,682,369 A | 10/1997 | Nakamichi | 369/75.2 |
| 5,719,844 A * | 2/1998 | Abe | 369/77.1 |
| 5,737,285 A | 4/1998 | Uchiyama | 369/34 |
| 5,748,596 A | 5/1998 | Nakamichi | 369/77.1 |
| 5,774,442 A * | 6/1998 | Nakamichi | 369/75.2 |
| 5,822,296 A | 10/1998 | Nakamichi | 369/192 |
| 5,828,645 A * | 10/1998 | Kim et al. | 369/30.78 |
| 5,856,966 A | 1/1999 | Nakamichi | 369/77.1 |
| 5,883,876 A | 3/1999 | Nakamichi | 369/270 |
| 5,886,968 A | 3/1999 | Nakamichi | 369/77.1 |
| 5,909,420 A | 6/1999 | Nakamichi | 369/77.1 |
| 6,178,153 B1 * | 1/2001 | Cho et al. | 369/192 |

FOREIGN PATENT DOCUMENTS

EP            0 558 302 A2    1/1993

* cited by examiner

Primary Examiner—Hoa T. Nguyen
Assistant Examiner—Jennifer M Dolan
(74) Attorney, Agent, or Firm—Pennie & Edmonds LLP

(57) ABSTRACT

A changer type compact disk reproduction device having a first disk transfer mechanism and a second disk transfer mechanism capable of transferring a disk inserted into the device between a reproduction position and a storage position. The first disk transfer mechanism include first and second disk guide sections that hold the outer peripheral faces of a disk inserted into the reproduction device and transfers the disk to a reproduction position. The second disk transfer mechanism include third and fourth disk guide sections that hold the outer peripheral faces of the disk and transfers the disk between a storage position and a position where the first disk transfer mechanism can hold the disk. Each transfer mechanism includes a timing belt that moves the disk along the transfer mechanism.

12 Claims, 10 Drawing Sheets

CHANGER TYPE COMPACT DISK REPRODUCTION DEVICE

FIELD OF THE INVENTION

This invention relates generally to a compact disk storage and reproduction device. More particularly, this invention relates to an improved way for transferring a compact disk between a reproduction position and a storage position.

BACKGROUND OF THE INVENTION

Devices which transfer compact disks internally between a playback or reproduction position and a storage position are known in the art. The use of a disk transfer mechanism consisting of two disk guide sections to transfer a disk within the device is also known. In such devices, the sides of the two disk guide sections that face the disk are grooved in order to engage and guide the edges of the outer peripheral face of a disk as the disk is transferred. It is also known that a disk can be driven by means of a timing belt contained within one of the two disk guide sections. As the timing belt turns, a disk can be rotated along the other disk guide section that is lined with a friction sheet. It is also known that both disk guide sections may contain timing belts. As both timing belts turn, a disk can be transferred without rotating.

One drawback of the prior art is that if the stocker, or disk storage unit, is not aligned with the center line of the disk transfer mechanism, one of the disk guide sections of the disk transfer mechanism may not be able to engage the outer peripheral face of a disk and as a result, may not be able to transfer the disk to and from the stocker. Another drawback of the prior art is that where disk guide sections of the disk transfer mechanism continue to hold a disk in the stocker after the disk is loaded in the stocker, it is impossible to store a disk at an arbitrary storage position in the stocker. Lastly, a final drawback of the prior art is that if the force with which the disk transfer mechanism transfers a disk to and from the stocker is weak, the transfer of the disk may be unstable.

It would be desirable to have a changer type compact disk reproduction device wherein the disk guide sections may engage the outer peripheral face of a disk even when the stocker is not perfectly aligned with the center line of the disk transfer mechanism. It would also be desirable to have a changer type compact disk reproduction device wherein a disk may be stored in an arbitrary storage position in the stocker. Finally, it would be desirable to have a changer type compact disk reproduction device that may securely transfer disks to and from the stocker.

SUMMARY OF THE INVENTION

The present invention is a compact disk storage and reproduction device that provides an improved way for transferring disks that are inserted into the device between a loading chassis, where reproduction (or playback) takes place, and a stocker, where storage takes place.

When a disk is inserted into the device, it is received by a first disk transfer mechanism. The first disk transfer mechanism is supported by the loading chassis and comprises a first disk guide section and a second disk guide section. The first and second disk guide sections are roughly parallel to each other and extend along opposite edges of the outer peripheral face of the disk. The first and second disk guide sections are also coupled to face each other and can be moved towards and away from each other. The sides of the first and second disk guide sections that face the disk engage and guide the edges of the outer peripheral faces of the disk as the disk is transferred. The first disk guide section can include a guide groove comprising an endless timing belt, or just an endless timing belt, that engages, drives, and rotates the top edge of the outer peripheral face of the disk as the disk is transferred. The second disk guide section can include a guide groove that is structured to prevent slippage between that guide section and the bottom edge of the outer peripheral face of the disk as the disk is driven and rotated along the second disk guide section. As the timing belt turns, the disk can be transferred to and from the second disk transfer mechanism.

The second disk transfer mechanism is also supported by the loading chassis and comprises a third disk guide section and a fourth disk guide section. The third and fourth disk guide sections move independently of each other. The sides of the third and fourth disk guide sections which face the disk engage and guide the edges of the outer peripheral faces of the disk as the disk is transferred. The third disk guide section can include a guide groove comprising an endless timing belt, or just an endless timing belt, and the fourth disk guide section can include a guide groove that is structured to prevent disk slippage. As the timing belt turns, the disk can be rotated and transferred along the fourth disk guide section between the stocker and the first disk transfer mechanism or vice-versa. In another embodiment, the second and fourth disk guide sections may also contain timing belts which drive the outer peripheral face of the disk at the same rate as the timing belts contained in the first and third disk guide sections, respectively. As such, the disk can be transferred without rotating.

The advantages of the present invention are threefold. First, because the disk guide sections of the second disk transfer mechanism move independently of each other, the second disk transfer mechanism is able to engage, guide, and transfer a disk to and from the stocker even when the stocker is not perfectly aligned with the center line of the disk transfer mechanism. Secondly, because the second disk transfer mechanism does not continue to hold disks once the disks are stored in the stocker, the loading chassis can be driven freely upwards and downwards along a set of guide shafts, thereby allowing a disk to be stored in arbitrary storage positions in the stocker. Finally, because a disk is strongly engaged by a roller contained in the second disk transfer mechanism, it is possible to transfer securely a disk to and from the stocker.

The features and advantages described in the specification are not all inclusive, and particularly, many additional features and advantages will be apparent to one of ordinary skill in the art in view of the drawings, specification and claims hereof.

BRIEF DESCRIPTION OF THE DRAWINGS

These and other objects, features and advantages of the present invention will be more readily apparent from the following detailed description of a preferred embodiment of the invention in which.

DETAILED DESCRIPTION OF PREFERRED EMBODIMENT

Figure 1:
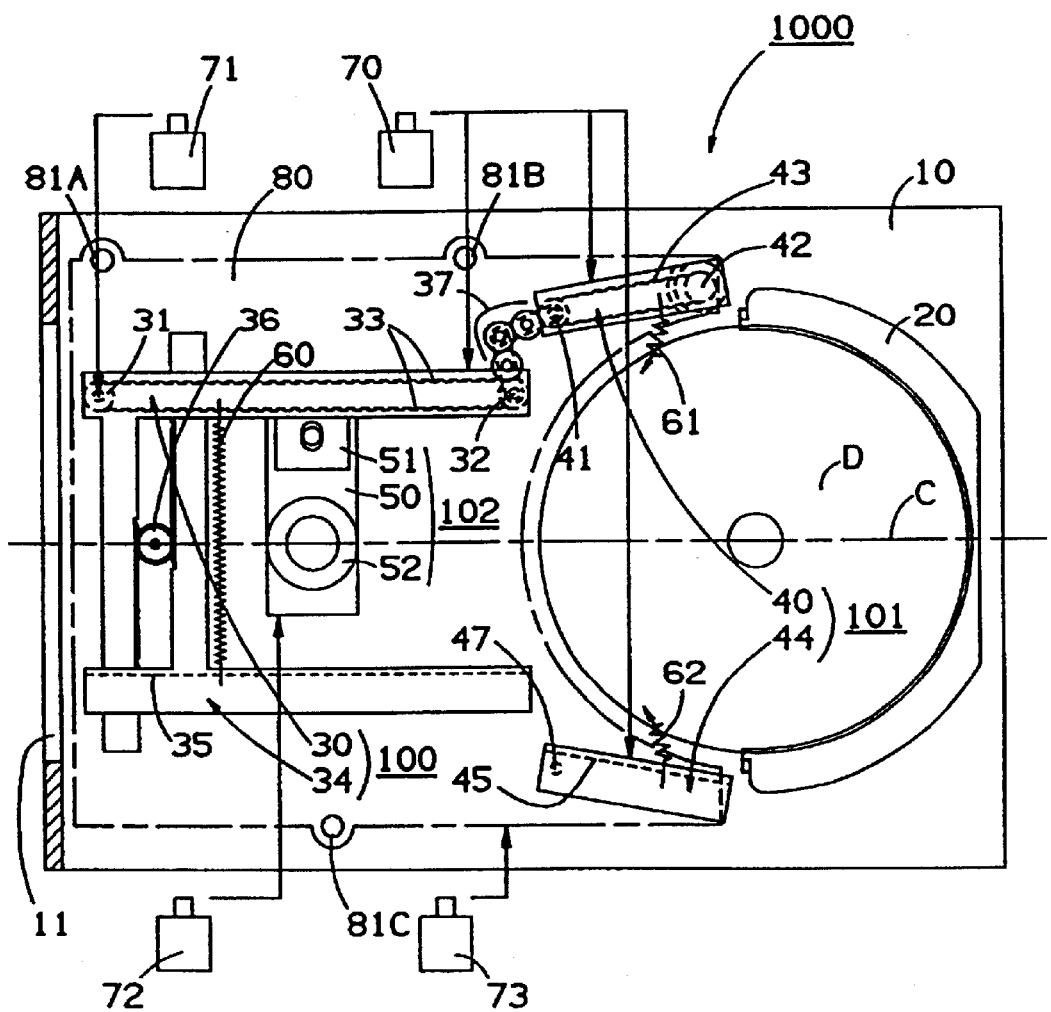
FIG. 1 is a top view of the main part of the changer type compact disk reproduction device according to the present invention in a disk insertion state.
Figure 2:
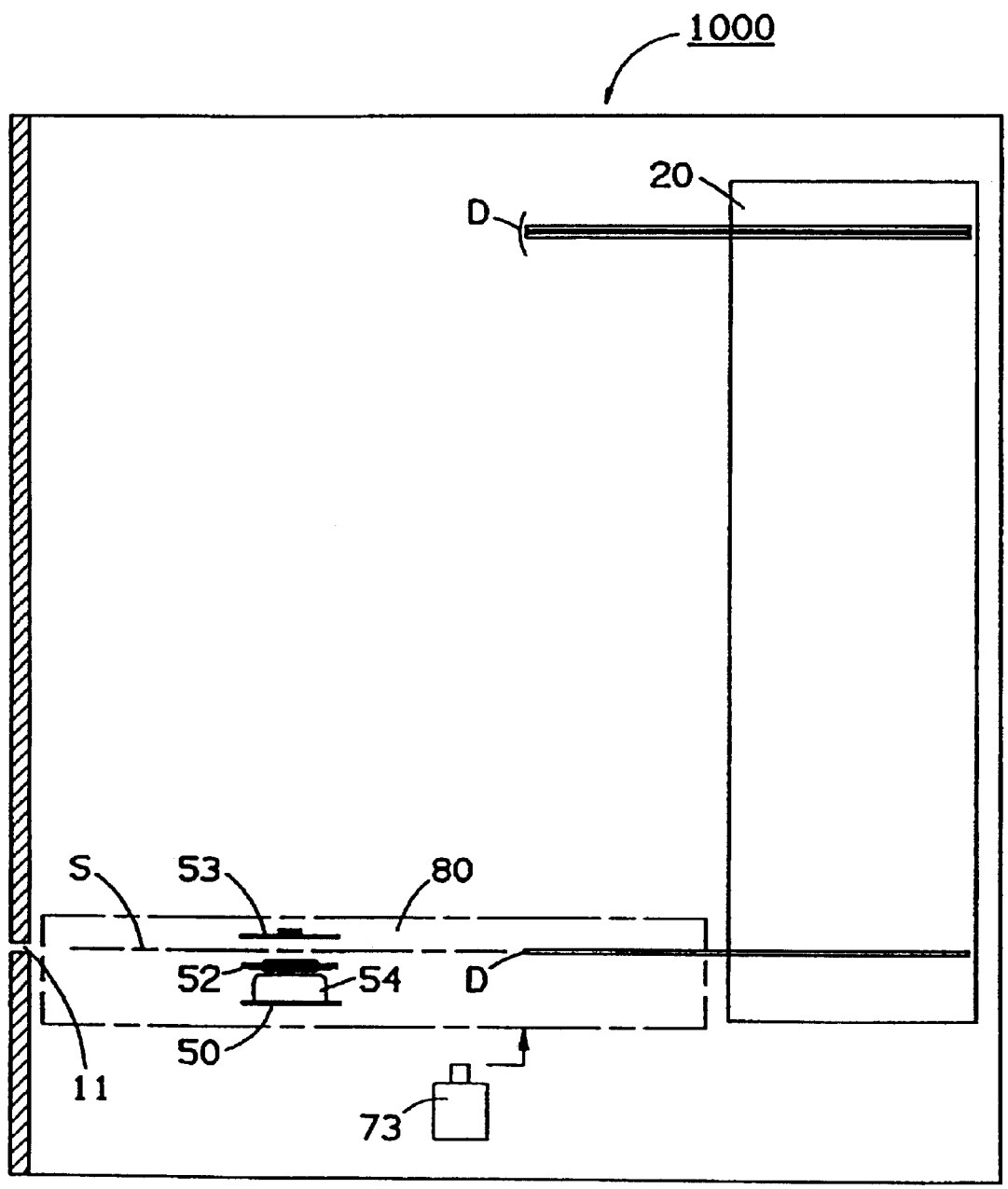
FIG. 2 is a side view of the main part of the changer type compact disk reproduction device shown in FIG. 1.

FIG. 1 is a top view of the main part of the changer type compact disk reproduction device and FIG. 2 shows a side view thereof.

A stocker 20 which is capable of storing a plurality of disks is fixed to and supported by a chassis 10. On the front panel of the device is a disk insertion opening 11. A disk inserted into the disk insertion opening 11 is received by the first disk transfer mechanism 100.

In this embodiment of the present invention, the first disk transfer mechanism 100 is supported by a loading chassis 80 and comprises a first disk guide section 30 and a second disk guide section 34. The first and second disk guide sections 30 and 34 are guided by a groove (not shown in the drawing) of the loading chassis 80 so as to be capable of being opened or closed. The first disk guide section 30 and second disk guide section 34 are roughly parallel to each other and extend along opposite edges of the outer peripheral face of the disk D. The first disk guide section 30 and second disk guide section 34 are coupled by means of a pinion gear 36 in such a manner that they may face each other and move towards each other, in the closing direction, or away from each other, in the opening direction. The first and second disk guide sections 30 and 34 are moved towards each other in the closing direction by means of spring 60 and an opening and closing mechanism 70. The inward pulling force of spring 60 is relatively weak so that it may not hinder disk transfer and so that the disk is readily accepted by the two disk guide sections 30 and 34. The first and second disk guide sections 30 and 34 are driven away from each other in the opening direction and against the inward pulling force of the spring 60 by means of an opening and closing mechanism 70. The opening and closing mechanism 70 widens the first and second disk guide sections 30 and 34 to an open position FIG. 3, which is greater than the diameter of the disk D. In this embodiment, spring 60 is suspended between the first and second disk guide sections 30 and 34, but it is permissible to suspend it between one of the disk guide sections and the loading chassis 80.

The side of the first disk guide section 30 which faces the disk D is grooved along the length of that side (not shown in the drawing) so as to act as a guide for the top edge of the outer peripheral face of the disk D. Within the guide groove of the first disk guide section 30 there is a first endless timing belt 33. The first timing belt 33 engages, drives, and rotates the top edge of the outer peripheral face of the disk D during transfer of the disk D by the first disk transfer mechanism 100. The first timing belt 33 runs between the pulleys 31 and 32. The pulley 31 is driven and rotated by means of a belt drive mechanism 71. The first timing belt 33 is driven and rotated as the pulley 31 is driven and rotated by the belt drive mechanism 71.

The side of the second disk guide section 34 which faces the disk D is grooved along the length of that side (not shown in the drawing) so as to act as a guide for the bottom edge of the outer peripheral face of the disk D. The guide groove of the second disk guide section 34 is lined with a friction sheet 35 having a coefficient of friction sufficient to prevent slippage between the second disk guide section 34 and the bottom edge of the outer peripheral face of the disk D as the disk D is driven and rotated by the first timing belt 33 along the second disk guide section 34.

The disk D inserted into the disk insertion opening 11 is held between the first and second disk guide sections 30 and 34 by the inward pulling force of the spring 60 and is transferred by the first disk transfer mechanism 100 to the rear of the device. The disk D rotates in the clock-wise direction about the point where the bottom edge of the outer peripheral face of the disk D touches the second disk guide section 34 while the first timing belt 33 rotates in the counter-clock-wise direction.

As shown in FIG. 2, the disk insertion opening 11, the disk transfer faces S of the first and second disk transfer mechanisms 100 and 101, and the disk storage position of the stocker 20 are all aligned on the same disk transfer plane. Therefore, a disk D can be transferred from the first disk transfer mechanism 100 to a position, which is approximately the mid-point between the reproduction position and the storage position, where it is received by the second disk transfer mechanism 101 and from the second disk transfer mechanism 101 to the stocker 20 without interruption.

The second disk transfer mechanism 101 is also supported by the loading chassis 80 and comprises a third disk guide section 40 and a fourth disk guide section 44. The third disk guide section 40 is able to rotate freely about the shaft of pulley 41. The third disk guide section 40 is pulled inward in the clock-wise direction by the inward pulling force of a spring 61. The side of the third disk guide section 40 which faces the disk D is grooved along the length of that side so as to act as a guide for the top edge of the outer peripheral face the disk D. Within the guide groove of the third guide disk section 40 there is a second endless timing belt 43. The second timing belt 43 engages and drives the top edge of the outer peripheral face of the disk D during transfer of the disk D by the second disk transfer mechanism 101. The second timing belt 43 runs between the pulley 41 and the roller 42 thereof. The pulley 41 is coupled to the pulley 32 by a gear train 37 which can be freely bent at the mid-point thereof. Therefore, the second timing belt 43 is driven and rotated together with the first timing belt 33 in the same direction independently of the opening and closing position of the first disk guide section 30.

The fourth disk guide section 44 is also able to rotate freely about the shaft of pulley 41. The fourth disk guide section 44 is pulled inward in the counter-clock-wise direction by the inward pulling force of a spring 62. The side of fourth disk guide section 44 which faces the disk D is grooved so as to act as a guide for the bottom edge of the outer peripheral face of the disk D. The guide groove of the fourth disk guide section 44 is lined with a friction sheet 45 having a coefficient of friction sufficient to prevent slippage between the fourth disk guide section 44 and the bottom edge of the outer peripheral face of the disk D as the disk D is driven and rotated by the timing belt 43 along the fourth disk guide section 44.

Because the third and fourth disk guide sections 40 and 44 move independently of each other, the second disk transfer mechanism 101 is able to engage and transfer the disk D to and from the stocker 20 even when the stocker 20 is not perfectly aligned with the center line of the disk transfer mechanism C.

The stocker 20 supports approximately 180 degrees of the outer peripheral face of the disk D in order to support the disk D stably. In order to withdraw the disk D from the stocker, the second disk transfer mechanism 101 must engage the portion of the outer peripheral face of the disk D not supported by the stocker 20. The second disk transfer mechanism 101 holds the disk D with stronger force than does the first disk transfer mechanism 100 because the inward pulling force of springs 61 and 62 is stronger than that of spring 60.

Figure 10:
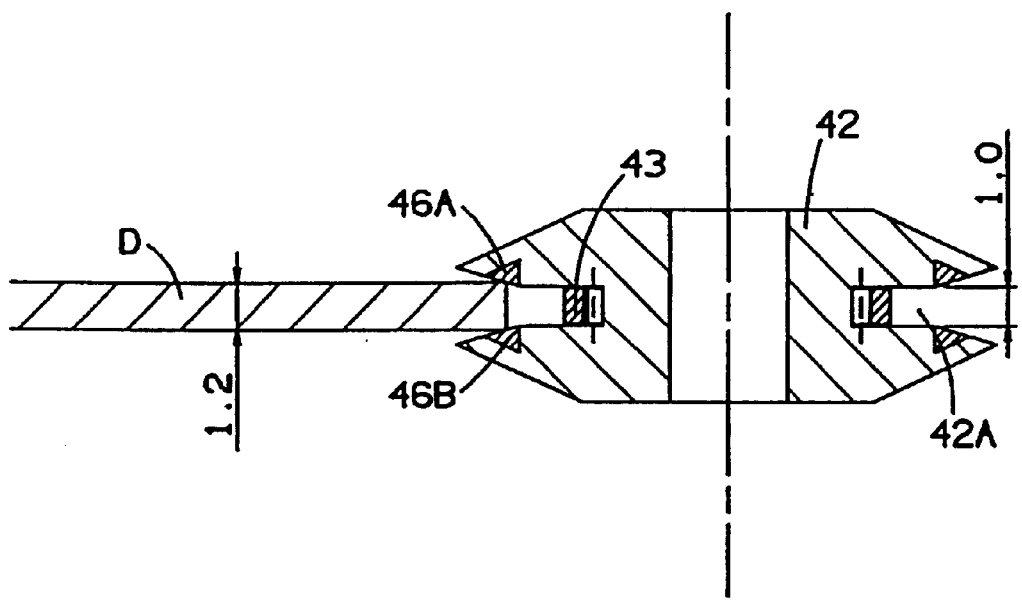
FIG. 10 is a cross sectional view of a positional relationship of a roller 42 and a disk D stored in the stocker.

In this embodiment, in order to further increase the disk transfer force to and from the stocker 20, the disk D is transferred by the second disk transfer mechanism 101 to and from the stocker 20 by means of a roller 42. As shown in FIG. 10, the roller 42 consists of a belt winding groove 42A whose face is sloped at its outer edges. The sloped face of the belt winding groove 42A is lined with friction members 46A and 46B having a higher frictional coefficient as compared to the second timing belt 43. The belt winding groove 42A may also be made of a rubber material instead of the material of the friction members 46A and 46B. The width (1.0 mm) of the belt winding groove 42A is narrower than the thickness (1.2 mm) of the disk D, and the width (0.9 mm) of the second timing belt 43 is slightly narrower than the width of the belt winding groove 42A. Therefore, the top edge of the outer peripheral face of the disk D engages with the friction members 46A and 46B, and is transferred by the second disk transfer mechanism 101 to and from the stocker 20 with the rotation of the roller 42. When the second disk transfer mechanism 101 disengages the disk D, the third disk guide section 40 and the fourth disk guide section 44 are driven in the opening direction by means of the opening and closing mechanism 70. The opening and closing mechanism 70 widens the third and fourth disk guide sections 40 and 44 to an open angle FIG. 5, apart from the outer peripheral faces of the disk D.

Figure 4:
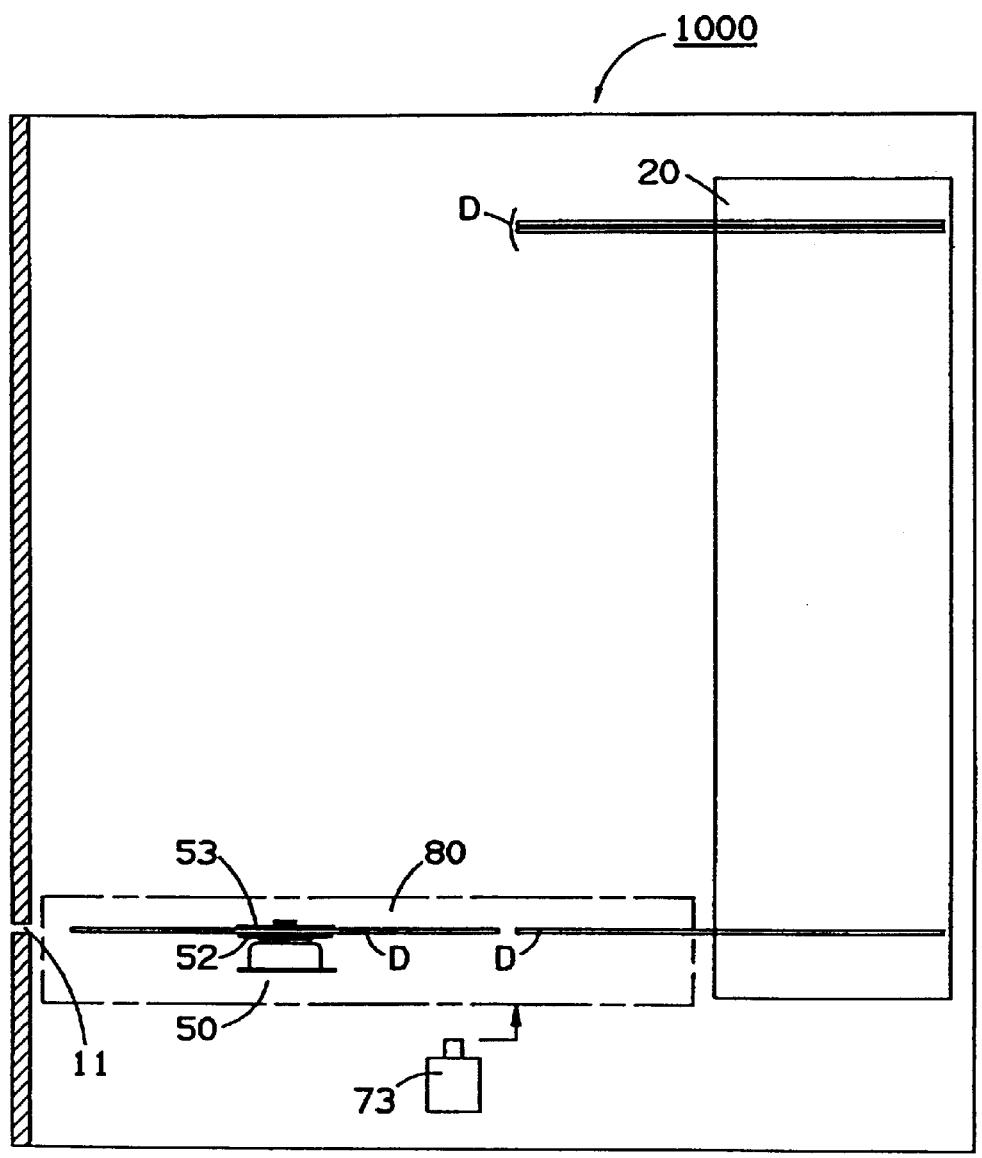
FIG. 4 is a side view of the main part of the changer type compact disk reproduction device shown in FIG. 3.

When the disk D is transferred to the reproduction position, the recorded information is optically read by means of a disk reproduction mechanism 102. An optico-mechanical base 50 is elastically supported on the loading chassis 80. A spindle motor 54 equipped with a turntable 52 and an optical head 51 which is movable in the radial direction of the disk are also supported on the loading chassis 80. A magnet clamper 53, which fixes a disk D on the turntable 52, is attached above the turntable 52 in such a manner that it may move freely upward and downward. The optico-mechanical base 50 and the clamper 53 are driven by means of a clamp mechanism 72. The clamp mechanism 72 moves the optico-mechanical base 50 and the clamper 53 between the unclamped position where the disk D is not clamped, as shown in FIG. 2, and the clamped position where the disk D at the reproduction position is clamped on the turntable 52, as shown in FIG. 4.

The loading chassis 80 is guided in a direction parallel to the disk storage axis of the stocker 20 by means of guide shafts 81A, 81B and 81C. In order to deliver a disk D to a storage position in the stocker 20, the loading chassis 80 is driven in the upward and downward directions by means of an up-down mechanism 73.

In the following, we shall explain a representative operation of the changer type compact disk reproduction device 1000.

First we shall explain the operation of the device wherein a disk D is inserted in the disk insertion opening 11 and reproduction commences. As shown in FIG. 1, when the loading chassis 80 is aligned with the disk insertion opening 11 and is ready to receive a disk D from outside the device, the first disk guide section 30 and the second disk guide section 34 are brought to the closed position, which is narrower than the diameter of the disk D, by the inward pulling force of the spring 60 and the opening and closing mechanism 70, and the third and fourth disk guide sections 40 and 44 have been brought to an open angle apart from the disk D present in the stocker 20 by the opening and closing mechanism 70. The optico-mechanical base 50 and the clamper 53 are moved to the unclamped position by the clamp mechanism 72 as shown in FIG. 2.

When the disk D is inserted into the disk insertion opening 11, the first and second disk guide sections 30 and 34 are pushed apart and engage the outer peripheral face of the disk D. When a sensor (which is not shown in the drawing) detects that the first and second disk guide sections 30 and 34 have been widened several millimeters, the first and second timing belts 33 and 43 start to rotate. The disk D is received into the device-by the first disk transfer mechanism 100 while rotating in the clock-wise direction as first and second timing belts 33 and 43 rotate in the counter-clockwise direction. The disk D is transferred to the reproduction position where it assumes co-axiality with the turntable 52.

At the reproduction position, the disk reproduction mechanism 102 and the clamper 53 are driven respectively towards each other by means of the clamp mechanism 72, and clamp the disk D between the turntable 52 and the clamper 53.

Figure 3:
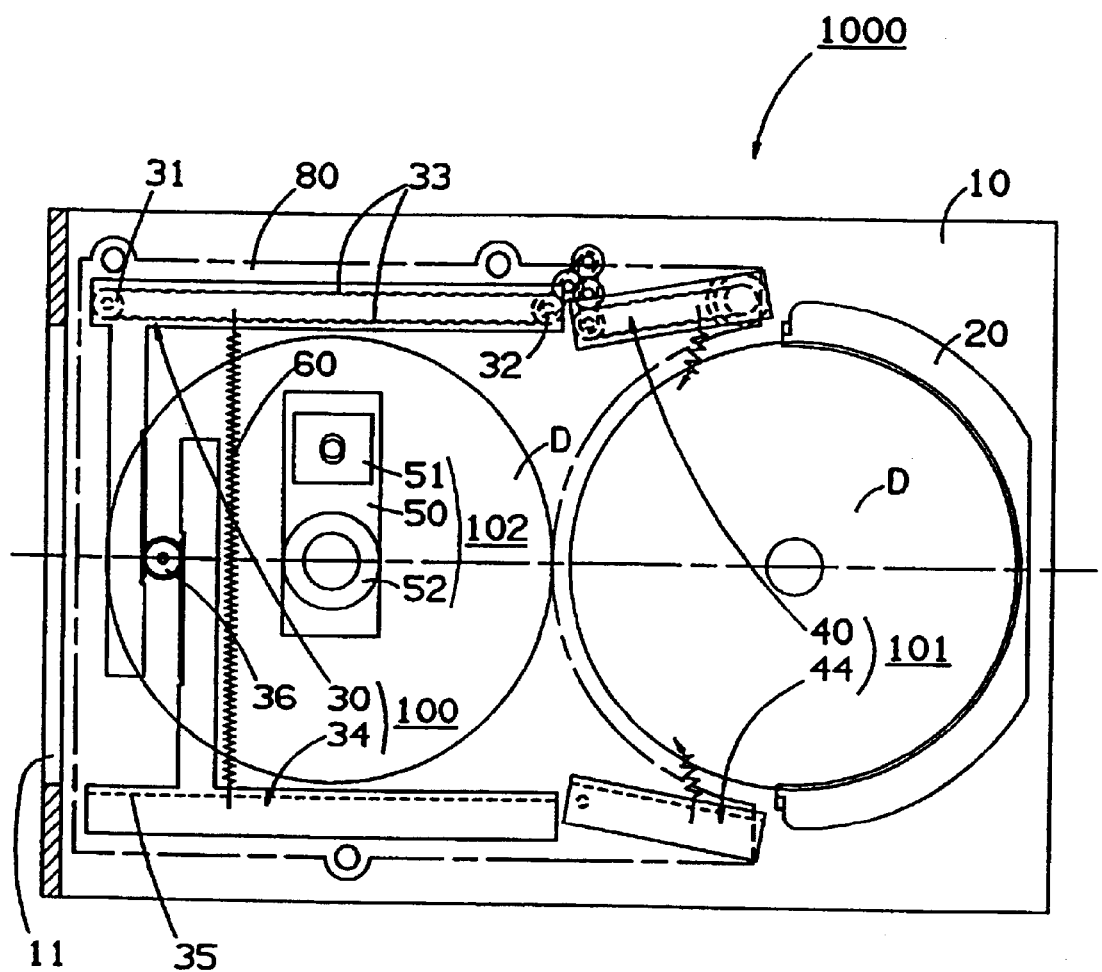
FIG. 3 is a top view of the main part of the changer type compact disk reproduction device according to the present invention in a reproduction state.

When clamping is complete, the first and second disk guide sections 30 and 34 are driven in the opening direction by means of the opening and closing mechanism 70, and are disengaged from the outer peripheral face of the disk D FIG. 3. Thereafter, the disk D is rotated at a pre-determined linear speed by means of a spindle motor 54, and the recorded information is optically read by means of the optical head 51.

Next, we shall explain the disk storing operation. Here we shall explain the operation for a case in which a disk at the reproduction position is stored in the storage position #50 which is the 50$^{th}$ from the bottom of the stocker 20.

Figure 5:
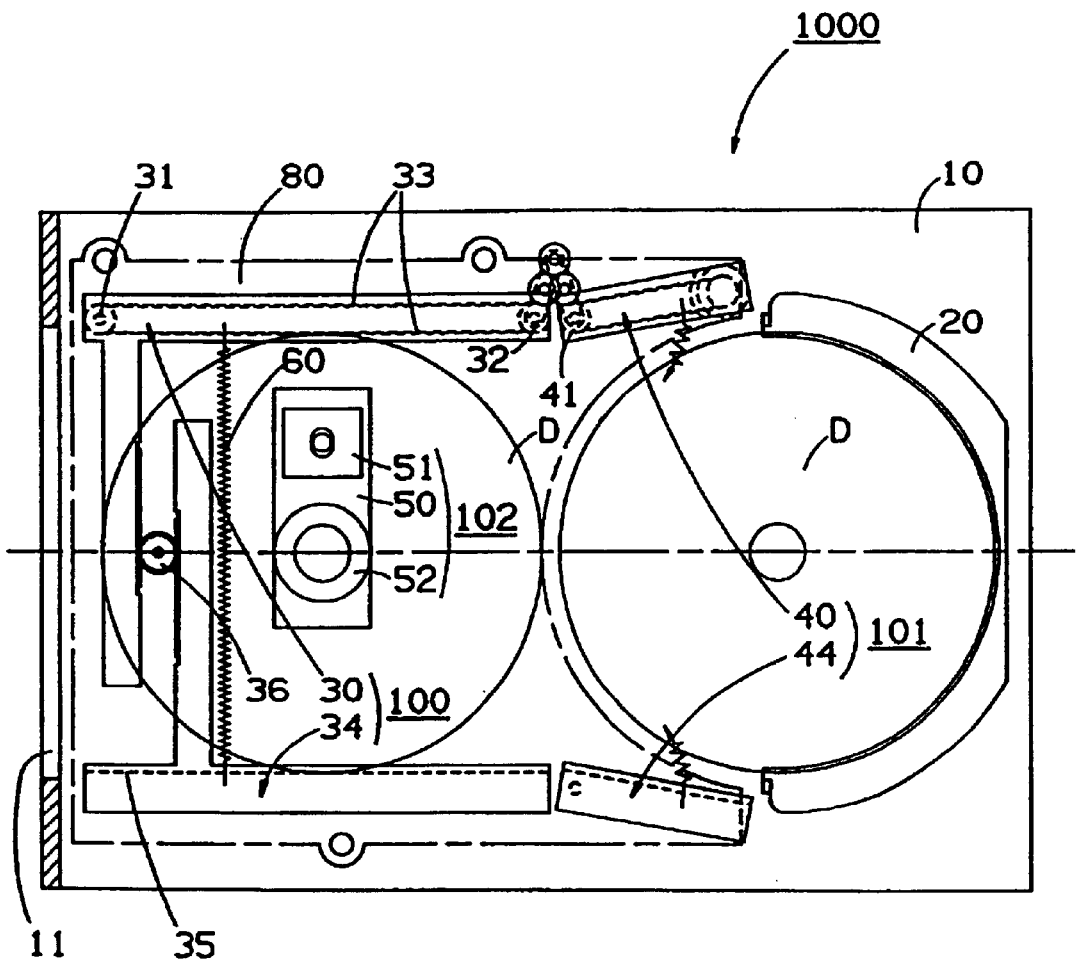
FIG. 5 is a top view of the main part of the changer type compact disk reproduction device according to the present invention during a disk change operation.

When disk location #50 (not shown in the drawing) is selected by the user, the first and second disk guide sections 30 and 34 are driven in the closing direction by means of the opening and closing mechanism 70, and engage the clamped disk D FIG. 5. The optico-mechanical base 50 and the clamper 53 are driven to the unclamped position by means of the clamp mechanism 72, and the clamp of the disk D is released.

Figure 6:
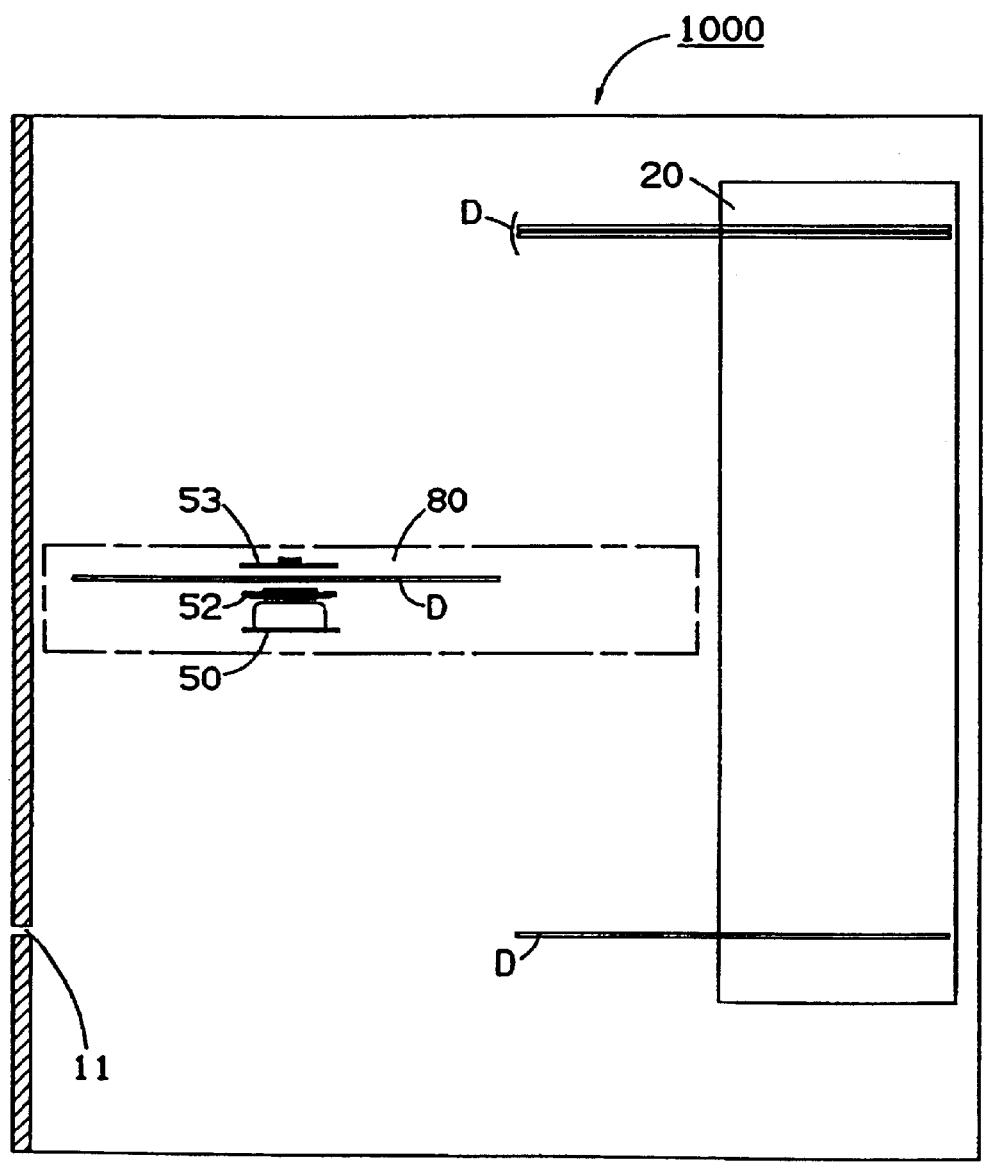
FIG. 6 is a side view of the main part of the changer type compact disk reproduction device shown in FIG. 5.
Figure 7:
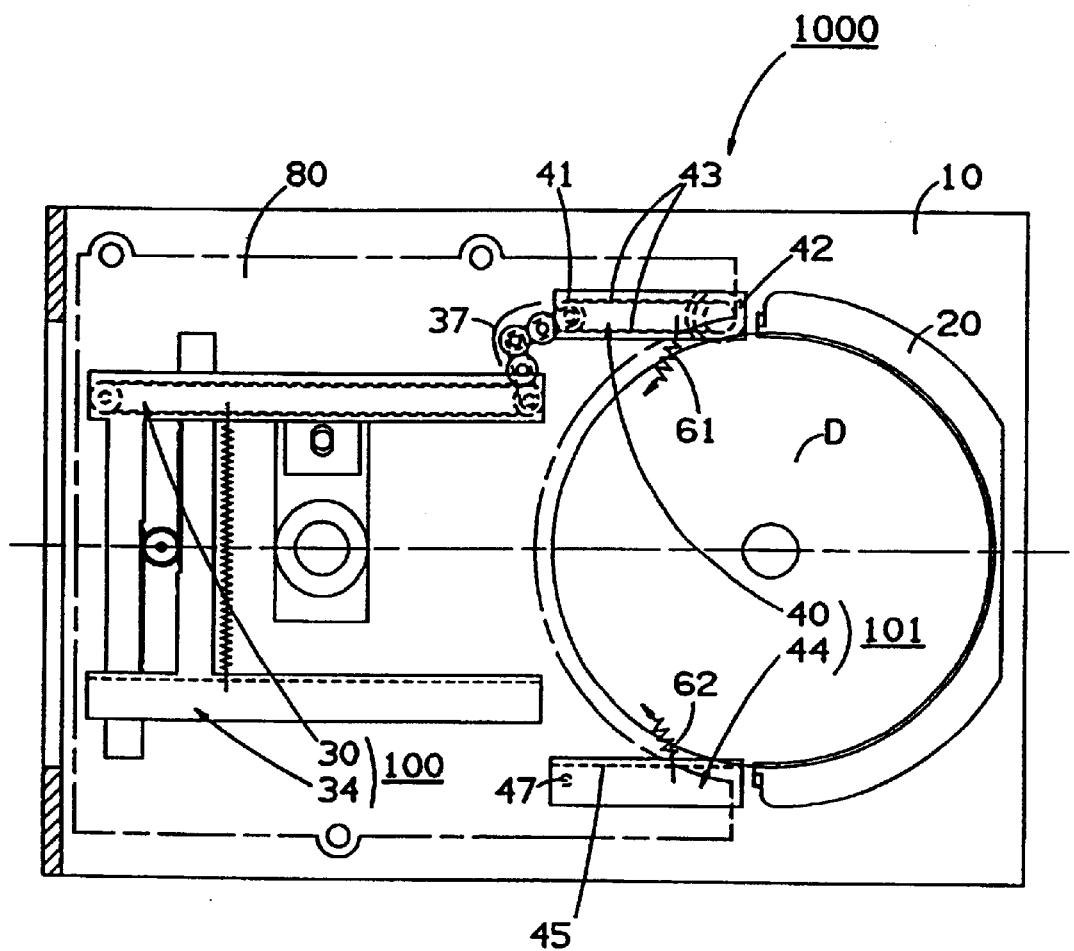
FIG. 7 is a top view of the main part of the changer type compact disk reproduction device according to the present invention in a disk storage state.

The loading chassis 80 is driven upward by means of the up-down mechanism 73, to a height where the disk transfer face thereof may be aligned with storage position #50 of the stocker 20 FIG. 6. The first and second disk guide sections 30 and 34 are driven in the closing direction by means of the opening and closing mechanism 70. The first and second timing belts 33 and 43 are driven and rotated in the counter-clockwise direction. The disk D is transferred from the first disk transfer mechanism 100 to the second disk transfer mechanism 101 while rotating in the clock-wise direction as the first and second timing belts 33 and 43 rotate in the counter-clockwise direction. When the disk D is engaged between the third and fourth disk guide sections 40 and 44, it is transferred to the rear of the device by the rotation of the second timing belt 43, and stored at the storage position #50, further driven by means of the roller 42 FIG. 7 and FIG. 8. The third and fourth disk guide sections 40 and 44 are then driven in the opening direction by means of the opening and closing mechanism 70, and disengaged from the outer peripheral face of the stored disk D FIG. 9.

Figure 8:
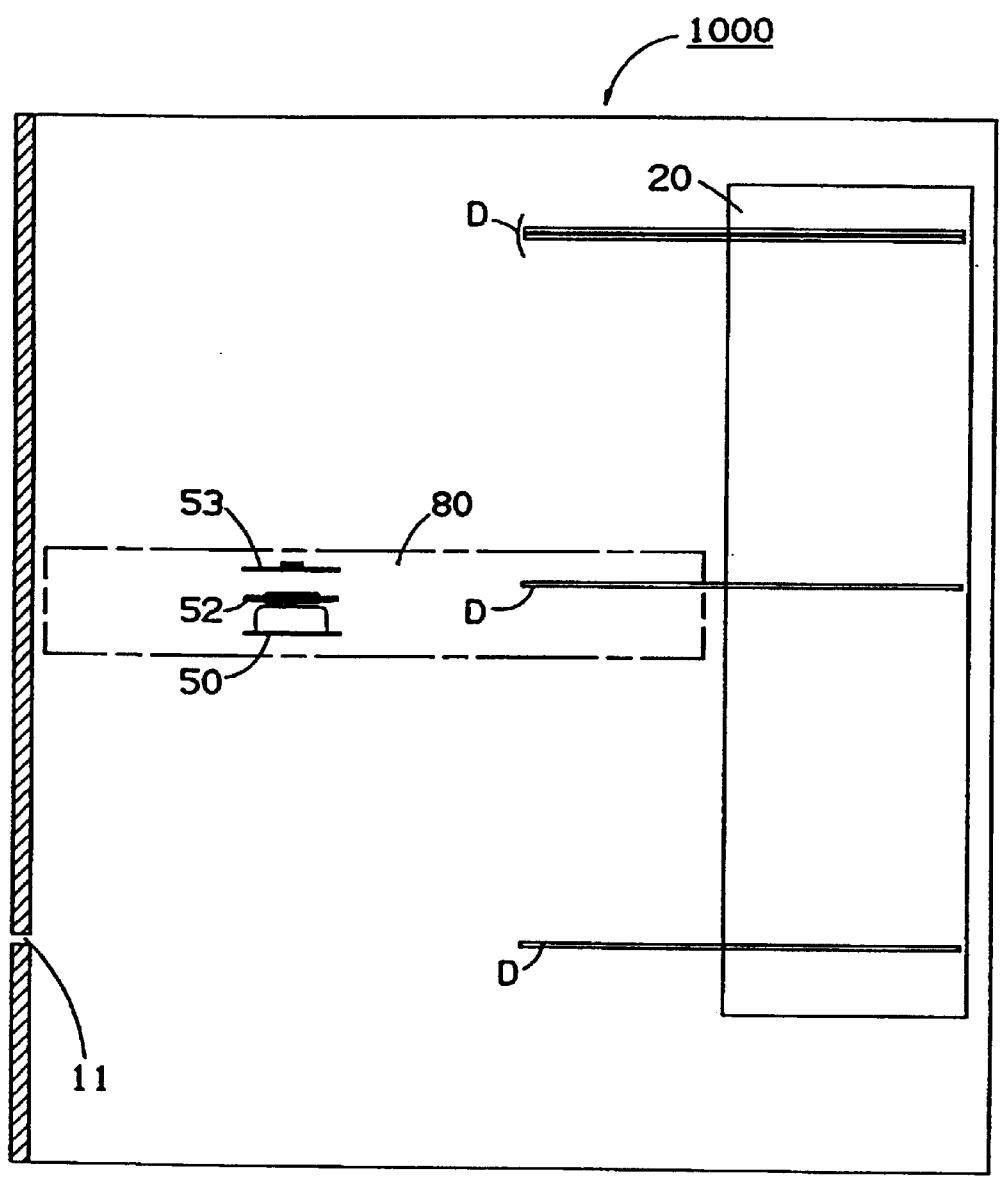
FIG. 8 is a side view of the main part of the disk reproduction device shown in FIG. 7.
Figure 9:
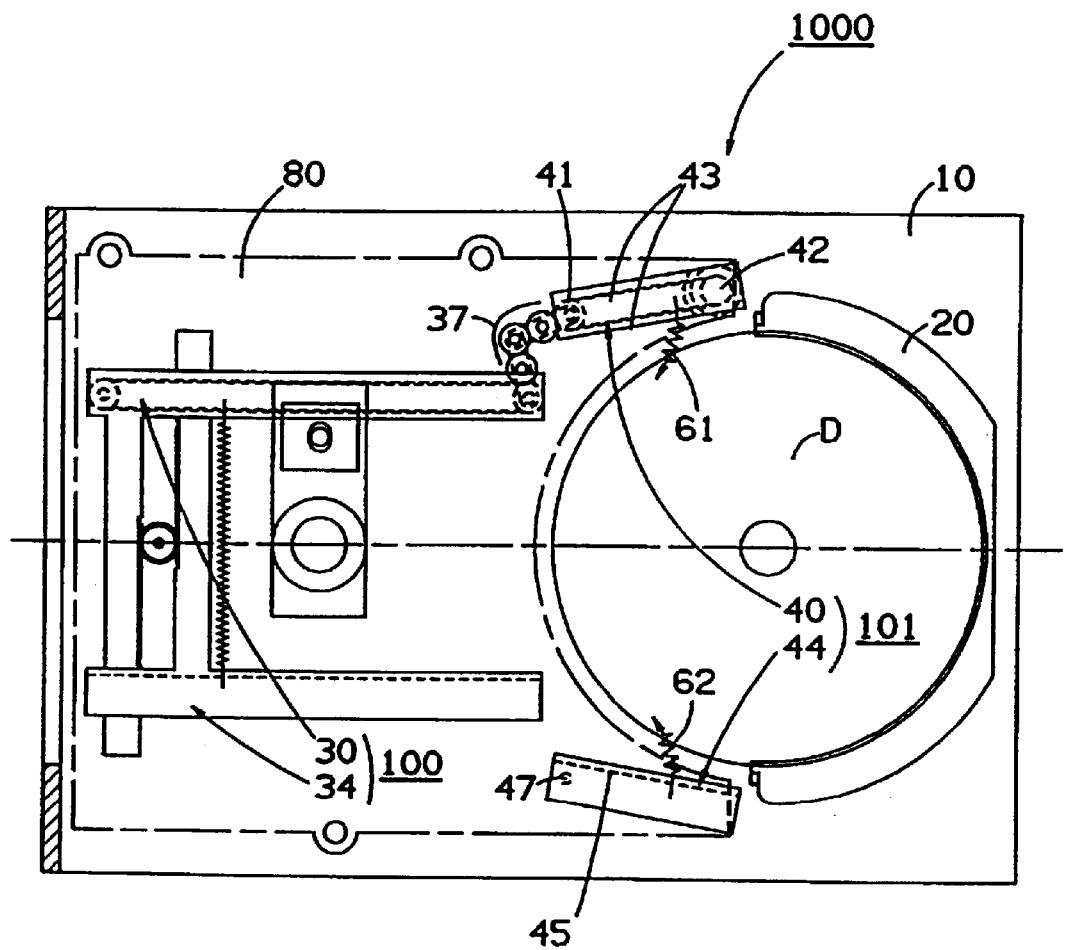
FIG. 9 is a top view of the main part of the changer type compact disk reproduction device according to the present invention in a stopped state.

Next, we shall explain the operation for a case in which a stored disk is reproduced. Here we shall explain the operation for a case in which a disk D which is stored in storage position #100 in the stocker 20 FIG. 8 and FIG. 9, is reproduced.

When disk location #100 (not shown in the drawing) is selected by the user, the loading chassis 80 is driven upward by means of the up-down mechanism 73 to a height where the disk transfer plane is aligned with the storage position #100, which is the $100^{th}$ from the bottom of the stocker 20. The third and fourth disk guide sections 40 and 44 are driven in the closing direction by means of the opening and closing mechanism 70 and engage the disk D stored at the storage position #100. The first and second timing belts 33 and 43 are rotated in the clock-wise direction. The disk D is transferred from storage position #100 in stocker 20 by the engagement with the roller 42 and the second timing belt 43. The disk D is transferred to the front of the device while rotating in the counter-clock-wise direction as the second timing belt 43 rotates in the clock-wise direction. The disk D is then transferred to the first disk transfer mechanism 100 and the first disk transfer mechanism 100 transfers the disk D to the reproduction position.

After the disk D is transferred to the reproduction position, the disk reproduction mechanism 102 and the clamper 53 are driven respectively towards each other in the closing direction by means of the clamp mechanism 72, and clamp the disk D. The first and second disk guide sections 30 and 34 are driven in the opening direction by means of the opening and closing mechanism 70, and are separated from the outer peripheral faces of the disk D. Finally, the reproduction of the disk D starts.

It is a matter of course that the present invention is not limited or restricted to the above-mentioned embodiment and that it may assume various modes without deviating from the scope of the claims.

For example, with the device according to the above-mentioned embodiment, a disk is held between a pair of disk guide sections that incorporate guide grooves that extend along the sides of the disk guide sections that face the disk. The disk is transferred by a timing belt contained within one of the disk guide sections. However, it is permissible to allow a timing belt to be contained in the other disk guide section which turns at the same rate as the timing belt in the first disk guide section so as to transfer the disk without rotating it. It is also permissible for a disk to be held between a pair of disk guide sections, each comprising a timing belt, by the timing belts without the two disk guide sections incorporating guide grooves.

With the device according to the above-mentioned embodiment, a disk is held between a pair of disk guide sections. One disk guide section comprises a timing belt and the other disk guide section is lined with a friction sheet having a coefficient of friction sufficient to prevent slippage between the edge of the outer peripheral face of a disk and that disk guide section as the disk is driven and rotated along that disk guide section by the timing belt. However, it is permissible for the timing belt to drive and rotate the disk along a disk guide section without that disk guide section being lined with a friction sheet.

With the device according to the above-mentioned embodiment, a disk D is inserted or removed from the stocker 20 by means of the roller 42 and the second timing belt 43 contained in the third disk guide section 40. However, it is also permissible for the third disk guide section 40 not to contain the roller and to insert or remove a disk D from the stocker 20 only by means of the second timing belt 43.

What is claimed is:

1. A changer type compact disk reproduction device comprising:
   a disk insertion opening,
   a disk reproduction mechanism,
   a stocker which is capable of storing a plurality of disks,
   a loading chassis supporting a first disk transfer mechanism and a second disk transfer mechanism,
      said first disk transfer mechanism comprising a first disk guide section and a second disk guide section, said first and second disk guide sections being roughly parallel to each other and coupled to face each other,
      said first and second disk guide sections being movable towards and away from each other in order to engage or disengage the outer peripheral face of a disk,
   at least one endless timing belt being rotatably supported by said first disk transfer mechanism,
      said second disk transfer mechanism comprising a third disk guide section and a fourth disk guide section,
      said third and fourth disk guide sections moving independently of each other in order to engage or disengage the outer peripheral face of a disk,
      at least one endless timing belt being rotatably supported by said second disk transfer mechanism.

2. The device of claim 1 wherein at least one of said first and second disk guide sections incorporates a guide groove that extends along the side of said at least one of said first and second disk guide sections that faces said disk.

3. The device of claim 2 wherein said guide groove of at least one of said first and second disk guide sections comprises an endless timing belt that runs between at least two pulleys.

4. The device of claim 3 wherein said guide groove of at least one of said first and second disk guide sections incorporates a friction sheet having a coefficient of friction sufficient to prevent slippage between the edge of the outer peripheral face of said disk and said at least one of said first and second disk guide sections.

5. The device of claim 1 wherein at least one of said third and fourth disk guide sections incorporates a guide groove that extends along the side of said at least one of said third and fourth disk guide sections that faces said disk.

6. The device of claim 5 wherein said guide groove of at least one of said third and fourth disk guide sections comprises an endless timing belt that runs between at least two pulleys.

7. The device of claim 6 wherein said guide groove of at least one of said third and fourth disk guide sections incorporates a friction sheet having a coefficient of friction sufficient to prevent slippage between the edge of the outer peripheral face of said disk and said at least one of said third and fourth disk guide sections.

8. The device of claim 6 wherein at least one of said at least two pulleys comprises a roller, said roller comprising a belt winding groove, said belt winding groove being lined with friction members having a coefficient of friction sufficient to prevent disk slippage as said second disk transfer mechanism transfers said disk.

9. The device of claim 1 wherein said first disk transfer mechanism receives a disk from said disk insertion opening, engages the outer peripheral face of said disk, transfers said disk to either said disk reproductive mechanism or to said second disk transfer mechanism, and disengages said disk.

10. The device of claim 1 wherein said first disk transfer mechanism receives a disk from said second disk transfer mechanism, engages the outer peripheral face of said disk, transfers said disk to said disk reproduction mechanism, and disengages said disk.

11. The device of claim 1 wherein said second disk transfer mechanism engages the outer peripheral face of a disk received from said first disk transfer mechanism, transfers said disk to said stocker, and disengages said disk.

12. The device of claim 1 wherein said second disk transfer mechanism engages the outer peripheral face of a disk stored in said stocker, transfers said disk to said first disk transfer mechanism, and disengages said disk.

* * * * *